US008551903B2

(12) United States Patent
Chen et al.

(10) Patent No.: US 8,551,903 B2
(45) Date of Patent: Oct. 8, 2013

(54) AMIDE ESTER INTERNAL ELECTRON DONOR AND PROCESS

(75) Inventors: Linfeng Chen, Missouri City, TX (US); Clark C. Williams, Katy, TX (US); Tak W. Leung, Houston, TX (US); Tao Tao, Houston, TX (US); Kuanqiang Gao, Pearland, TX (US); Xiaodong Huang, Houston, TX (US); James X. Shu, legal representative, Houston, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 13/580,414

(22) PCT Filed: Feb. 24, 2011

(86) PCT No.: PCT/US2011/026036
§ 371 (c)(1),
(2), (4) Date: Aug. 22, 2012

(87) PCT Pub. No.: WO2011/106500
PCT Pub. Date: Sep. 1, 2011

(65) Prior Publication Data
US 2012/0316299 A1    Dec. 13, 2012

Related U.S. Application Data

(60) Provisional application No. 61/308,543, filed on Feb. 26, 2010.

(51) Int. Cl.
*B01J 31/00* (2006.01)
*B01J 27/24* (2006.01)
*C08F 4/44* (2006.01)
*C08F 4/06* (2006.01)
*C08F 2/00* (2006.01)
*C08F 4/00* (2006.01)

(52) U.S. Cl.
USPC ........... 502/127; 502/123; 502/167; 502/200; 526/141; 526/147; 526/215; 526/217; 526/236

(58) Field of Classification Search
USPC .......... 502/123, 167, 200; 526/141, 147, 215, 526/217, 236
See application file for complete search history.

(56) References Cited

U.S. PATENT DOCUMENTS

| 4,325,838 | A | * | 4/1982 | Tanaka et al. ................. 502/112 |
| 4,414,132 | A | * | 11/1983 | Goodall et al. ............... 502/104 |
| 5,652,314 | A | | 7/1997 | Wagner et al. |
| 6,825,146 | B2 | | 11/2004 | Kilty et al. |
| 7,351,778 | B2 | | 4/2008 | Gao et al. |
| 7,388,061 | B2 | | 6/2008 | Gao et al. |
| 2005/0096389 | A1 | | 5/2005 | Gao et al. |
| 2012/0322962 | A1 | | 12/2012 | Chen et al. |
| 2012/0322964 | A1 | | 12/2012 | Chen |

FOREIGN PATENT DOCUMENTS

| CN | 101104589 | | 1/2008 |
| CN | 101104589 | A * | 1/2008 |
| CN | 101104656 | | 1/2008 |
| CN | 101104656 | A * | 1/2008 |
| WO | 2006/110234 | A2 | 10/2006 |
| WO | WO 2006110234 | A2 * | 10/2006 |

OTHER PUBLICATIONS

English translation of CN 101104656 A.*
English translation of CN 101104589 A.*

* cited by examiner

*Primary Examiner* — David W Wu
*Assistant Examiner* — Elizabeth Eng
(74) *Attorney, Agent, or Firm* — Whyte Hirschboeck Dudek S.C.

(57) ABSTRACT

Disclosed is a process for producing a procatalyst composition having an amide ester internal electron donor. The process includes pre-halogenating a procatalyst precursor before reaction with the amide ester and forming the procatalyst composition. Ziegler-Natta catalyst compositions containing the present procatalyst composition exhibit improved catalyst activity and/or improved catalyst selectivity and produce propylene-based olefins with broad molecular weight distribution.

5 Claims, No Drawings

AMIDE ESTER INTERNAL ELECTRON DONOR AND PROCESS

CROSS REFERENCE TO RELATED APPLICATION

The present application is the national phase of PCT Patent Application No. PCT/US2011/026036 filed Feb. 24, 2011, which claims the benefit of U.S. Ser. No. 61/308,543 filed Feb. 26, 2010. The entire content of which is incorporated by reference herein.

BACKGROUND

The present disclosure relates to procatalyst compositions with amide ester internal electron donor, catalyst compositions containing the same, and polymer produced therefrom.

Worldwide demand for olefin-based polymers continues to grow as applications for these polymers become more diverse and more sophisticated. Olefin-based polymers with broad molecular weight distribution (MWD), for example, find increasing applications in thermoforming; pipe-, foam-, blow-molding; and films. Known are Ziegler-Natta catalyst compositions for the production of olefin-based polymers, particularly propylene-based polymers, with broad MWD. Ziegler-Nana catalyst compositions typically include a procatalyst composed of a transition metal halide (i.e., titanium, chromium, vanadium) supported on a metal or metalloid compound, such as magnesium chloride or silica, the procatalyst complexed with a cocatalyst such as an organoaluminum compound. Production of olefin-based polymers with broad MWD produced by way of Ziegler-Natta catalysts, however, is typically limited to a single reactor process requiring rigorous process control and/or a series reactor process requiring multiple reactors.

Given the perennial emergence of new applications for olefin-based polymers, the art recognizes the need for olefin-based polymers with improved and varied properties. Desirable would be a Ziegler-Natta catalyst composition that produces olefin-based polymer, and propylene-based polymer in particular, with broad molecular weight distribution (MWD) with less process constraints and less equipment.

SUMMARY

The present disclosure is directed to amide ester internal electron donors and the use of same in procatalyst and catalyst compositions. Catalyst compositions containing the amide ester internal electron donor find application in olefin polymerization processes. The present amide ester-containing catalyst compositions have high catalyst activity, high catalyst selectivity, and produce propylene-based olefins with high isotacticity and broad molecular weight distribution.

In an embodiment, a process is provided and includes pre-halogenating a procatalyst precursor with a halogenating agent, and adding an amide ester to the halogenated procatalyst precursor in a reaction mixture. The process further includes forming a procatalyst composition comprising a magnesium moiety, a titanium moiety, and an internal electron donor comprising the amide ester.

In an embodiment, a procatalyst composition is provided and includes a combination of a magnesium moiety, a titanium moiety, and a mixed internal electron donor. The mixed internal electron donor includes an amide ester and an electron donor component. The electron donor component may be a benzoate.

In an embodiment, a catalyst composition is provided and includes a procatalyst composition and a cocatalyst. The procatalyst composition includes a combination of a magnesium moiety, a titanium moiety, and a mixed internal electron donor. The mixed internal electron donor includes an amide ester and an electron donor component. The electron donor component may be a benzoate.

In an embodiment, a process for producing an olefin-based polymer is provided. The process includes contacting, under polymerization conditions, an olefin with a catalyst composition. The catalyst composition includes a mixed internal electron donor. The mixed internal electron donor includes an amide ester and an electron donor component. The process further includes forming an olefin-based polymer.

An advantage of the present disclosure is the provision of a process for producing improved procatalyst composition.

An advantage of the present disclosure is the provision of an improved procatalyst composition.

An advantage of the present disclosure is the provision of an improved catalyst composition for the polymerization of olefin-based polymers.

An advantage of the present disclosure is an amide-ester containing catalyst composition with improved catalyst activity and/or improved catalyst selectivity.

An advantage of the present disclosure is the provision of a phthalate-free catalyst composition and a phthalate-free olefin-based polymer produced therefrom.

An advantage of the present disclosure is a catalyst composition that produces a propylene-based polymer with broad molecular weight distribution and/or high isotacticity.

An advantage of the present disclosure is a catalyst composition that produces a propylene-based polymer with broad molecular weight distribution in a single reactor.

DETAILED DESCRIPTION

The present disclosure provides a process for improving catalyst activity and/or catalyst selectivity. The process includes allowing a procatalyst precursor to at least partially react with a halogenating agent prior to reaction with an amide ester internal electron donor. This sequential reaction procedure during procatalyst formation increases the catalyst activity/selectivity of the procatalyst composition.

In an embodiment, a process is provided and includes pre-halogenating a procatalyst precursor with a halogenating agent. The process also includes adding an amide ester to the halogenated procatalyst in a reaction mixture, and forming a procatalyst composition comprising a magnesium moiety, a titanium moiety, and an internal electron donor comprising the amide ester.

The procatalyst precursor may be a magnesium moiety compound (MagMo), a magnesium mixed metal compound (MagMix), or a benzoate-containing magnesium chloride compound (BenMag). In an embodiment, the procatalyst precursor is a magnesium moiety ("MagMo") precursor. The "MagMo precursor" contains magnesium as the sole metal component. The MagMo precursor includes a magnesium moiety. Nonlimiting examples of suitable magnesium moieties include anhydrous magnesium chloride and/or its alcohol adduct, magnesium alkoxide or aryloxide, mixed magnesium alkoxy halide, and/or carbonated magnesium dialkoxide or aryloxide. In one embodiment, the MagMo precursor is a magnesium di-($C_{1-4}$)alkoxide. In a further embodiment, the MagMo precursor is diethoxymagnesium.

The MagMix includes magnesium and at least one other metal atom. The other metal atom can be a main group metal or a transition metal, or a transition metal of IIIB-VIIIB element. In an embodiment, the transition metal is selected from Sc, Ti, V, Cr, Mn, Fe, Co, Ni, Y, Zr, Nb, and Hf. In a further embodiment, the MagMix precursor is a mixed magnesium/titanium compound ("MagTi"). The "MagTi precursor" has the formula $Mg_dTi(OR^e)_fX_g$ wherein $R^e$ is an aliphatic or aromatic hydrocarbon radical having 1 to 14 carbon atoms or COR' wherein R' is an aliphatic or aromatic hydrocarbon radical having 1 to 14 carbon atoms; each $OR^e$ group is the same or different; X is independently chlorine, bromine or iodine, preferably chlorine; d is 0.5 to 56, or 2 to 4; f is 2 to 116 or 5 to 15; and g is 0.5 to 116, or 1 to 3.

In an embodiment, the procatalyst precursor is a benzoate-containing magnesium chloride material. As used herein, a "benzoate-containing magnesium chloride" ("BenMag") is a magnesium chloride procatalyst (i.e., a halogenated procatalyst precursor) containing a benzoate internal electron donor. The BenMag material may also include a titanium moiety, such as a titanium halide. The benzoate internal donor is labile and can be replaced by other electron donors during procatalyst synthesis. Nonlimiting examples of suitable benzoate groups include ethyl benzoate, methyl benzoate, ethyl p-methoxybenzoate, methyl p-ethoxybenzoate, ethyl p-ethoxybenzoate, ethyl p-chlorobenzoate. In one embodiment, the benzoate group is ethyl benzoate. Nonlimiting examples of suitable BenMag procatalyst precursors include catalysts of the trade names SHAC™ 103 and SHAC™ 310 available from The Dow Chemical Company, Midland, Mich.

In an embodiment, the BenMag procatalyst precursor is a product of halogenation of any procatalyst precursor (i.e., a MagMo precursor or a MagMix precursor) in the presence of a benzoate compound with the structure (IV):

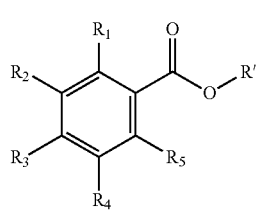

(IV)

wherein each of $R_1$-$R_5$ is selected from hydrogen, a $C_1$-$C_{20}$ hydrocarbyl group which may contain heteroatoms including F, Cl, Br, I, O, S, N, P, and Si. R' is a $C_1$-$C_{20}$ hydrocarbyl group which may optionally contain heteroatom(s) including F, Cl, Br, I, O, S, N, P, and Si. In an embodiment, each of $R_1$-$R_5$ is selected from hydrogen and a $C_1$-$C_{20}$ alkyl group and R' is selected from a $C_1$-$C_{20}$ alkyl group and a $C_1$-$C_{20}$ alkoxyalkyl group.

The formed procatalyst precursor is used to produce a procatalyst composition. The present process includes prehalogenating the procatalyst precursor with a halogenating agent. The process further includes adding an amide ester to the halogenated procatalyst precursor in a reaction mixture to form a procatalyst composition. The term, "pre-halogenating" or "pre-halogenation," as used herein, is the halogenation of the procatalyst precursor before reaction with an the amide ester. In other words, pre-halogenation requires reaction between a halogenated procatalyst precursor and an amide ester, the procatalyst precursor halogenated before reaction with the amide ester. A "halogenating agent," as used herein, is a compound that converts an alkoxy moiety of the procatalyst precursor into a halide form. A "titanating agent," as used herein, is a compound that provides the catalytically active titanium species. Halogenation and titanation convert the magnesium moiety present in the procatalyst precursor into a magnesium halide support upon which the titanium moiety (such as a titanium halide) is deposited. The pre-halogenated procatalyst precursor has an alkoxy content from 0 wt % to less than 2.0 wt %, or from 0.1 wt % to less than 1.0 wt %, based on the total weight of the halogenated procatalyst composition.

In an embodiment, the halogenating agent is a titanium halide having the formula $Ti(OR^e)_fX_h$ wherein $R^e$ and X are defined as above, f is an integer from 0 to 3; h is an integer from 1 to 4; and f+h is 4. In this way, the titanium halide is simultaneously the halogenating agent and the titanating agent. In a further embodiment, the titanium halide is $TiCl_4$ and halogenation occurs by way of chlorination of the procatalyst precursor with the $TiCl_4$. The chlorination (and titanation) may be conducted in the presence of, or in the absence of, hydrocarbon or halohydrocarbon liquid.

In an embodiment, the chlorination is conducted in the presence of a hydrocarbon and/or halohydrocarbon. The hydrocarbon or halohydrocarbon employed in the production of the procatalyst can be a halohydrocarbon of up to 12 carbon atoms inclusive, or up to 9 carbon atoms inclusive, which contains at least one halogen atom, and in the case of aliphatic halohydrocarbons contains at least two halogen atoms. Nonlimiting examples of suitable hydrocarbons include pentanes, hexanes, heptanes, octanes, benzene, toluene, xylenes, alkylbenzenes, decahydronaphthalene, and the like.

Nonlimiting examples of suitable aliphatic halohydrocarbons include methylene chloride, methylene bromide, chloroform, carbon tetrachloride, 1,2-dibromoethane, 1,1,2-trichloroethane, trichlorocyclohexane, dichlorofluoromethane and tetrachlorooctane. Aromatic halohydrocarbons suitably employed in the present disclosure include chlorobenzene, bromobenzene, dichlorobenzenes and chlorotoluenes. Of the aliphatic halohydrocarbons, carbon tetrachloride and 1,1,2-trichloroethane are preferred. The aromatic halohydrocarbon chlorobenzene and chlorotoluenes are particularly preferred. In yet another embodiment, the halogenation and the titanation are conducted by use of a mixture of halogenating agent and chlorinated aromatic liquid composed of from 40% vol to 60% vol halogenating agent, such as $TiCl_4$.

The procatalyst composition may be made via (1) prehalogenation followed by further halogenation/titanation in the presence of the amide ester internal donor; or (2) halogenation/titanation of a pre-halogenated precursor in the presence of the amide ester internal donor. In an embodiment, the procatalyst precursor composition is pre-halogenated with a halogenating agent in a reaction mixture. The reaction mixture is heated to a temperature from about 30° C. to about 150° C., or from about 90° C. to about 130° C., or about 115° C., during pre-halogenation. The pre-halogenation has a duration from about one minute to about five hours, or from about 2 minutes to about 30 minutes, or from about 3 minutes to about 15 minutes. The procatalyst precursor and the halogenating agent are allowed to react for the stated time duration to form a halogenated procatalyst precursor prior to addition of the amide ester to the reaction mixture.

The amide ester is subsequently added to the halogenated procatalyst precursor in a reaction mixture. Halogenation of the procatalyst precursor continues in the presence of the amide ester. The reaction mixture is heated to a temperature from about 70° C. to about 130° C., or about 115° C., for about one minute to about 4 hours. The amide ester is an internal electron donor. As used herein, an "internal electron donor" is a compound added or otherwise formed during formation of the procatalyst composition that donates at least one pair of electrons to one or more metals present in the resultant procatalyst composition. Not wishing to be bound by any particular theory, it is believed that during halogenation and titanation the internal electron donor (1) regulates the formation of active sites, (2) regulates the position of titanium on the magnesium-based support and thereby enhances catalyst stereoselectivity, (3) facilitates conversion of the magnesium and titanium moieties into respective halides and (4) regulates the crystallite size of the magnesium halide support during conversion. Thus, provision of the internal electron donor yields a procatalyst composition with enhanced stereoselectivity.

In an embodiment, the amide ester has the structure (I):

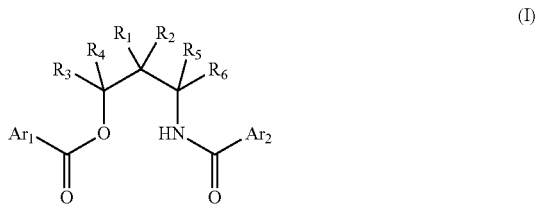

(I)

wherein $R_1$-$R_6$ are the same or different. Each of $R_1$-$R_6$ is selected from hydrogen, a halogen, and a substituted/unsubstituted hydrocarbyl group having 1-20 atoms. $Ar_1$ and $Ar_2$ are the same or different. Each of $Ar_1$ and $Ar_2$ is selected from a substituted/unsubstituted aryl group having 6-20 atoms and a substituted/unsubstituted arylalkyl group having 7-20 carbon atoms.

Two or more of $R_1$-$R_6$ may link to form a mono-cyclic or a poly-cyclic structure. $Ar_1$ and/or $Ar_2$ may be a mono-aromatic or a poly-aromatic structure. $Ar_1$ and/or $Ar_2$ may also include straight, branched, acyclic or cyclic substituents. Nonlimiting examples for $Ar_1$ and/or $Ar_2$ include a phenyl group, a naphthyl group, an anthracenyl group, and a phenanthrenyl group.

As used herein, the term "hydrocarbyl" or "hydrocarbon" is a substituent containing only hydrogen and carbon atoms, including branched or unbranched, saturated or unsaturated, cyclic, polycyclic, fused, or acyclic species, and combinations thereof. Nonlimiting examples of hydrocarbyl groups include alkyl-, cycloalkyl-, alkenyl-, alkadienyl-, cycloalkenyl-, cycloalkadienyl-, aryl-, aralkyl, alkylaryl-, and alkynyl-groups.

As used herein, the term "substituted hydrocarbyl" or "substituted hydrocarbon" is a hydrocarbyl group that is substituted with one or more nonhydrocarbyl substituent groups. A nonlimiting example of a nonhydrocarbyl substituent group is a heteroatom. As used herein, a "heteroatom" is an atom other than carbon or hydrogen. The heteroatom can be a non-carbon atom from Groups IV, V, VI, and VII of the Periodic Table. Nonlimiting examples of heteroatoms include: halogens (F Cl, Br, I), N, O, P, B, S, and Si. A substituted hydrocarbyl group also includes a halohydrocarbyl group and a silicon-containing hydrocarbyl group. As used herein, the term "halohydrocarbyl" group is a hydrocarbyl group that is substituted with one or more halogen atoms.

In an embodiment, the amide ester is a halogenated amide ester as disclosed in U.S. provisional patent application Ser. No. 61/308,654 filed on Feb. 26, 2010, the entire content of which is incorporated by reference herein. In an embodiment, each of $Ar_1$ and $Ar_2$ is halogenated.

In an embodiment, the amide ester is a substituted amide ester as disclosed in U.S. provisional patent application Ser. No. 61/308,596 filed on Feb. 26, 2010, the entire content of which is incorporated by reference herein.

In an embodiment, the amide ester has the structure (II):

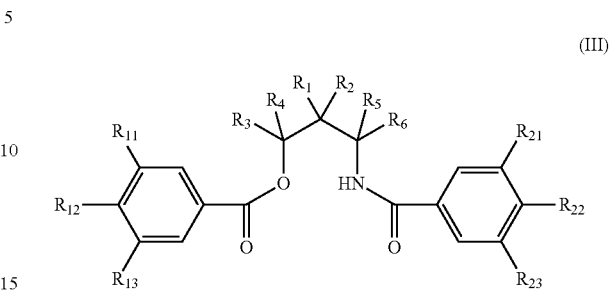

(III)

wherein $R_1$-$R_6$, $R_{11}$-$R_{13}$, and $R_{21}$-$R_{23}$ are the same or different. Each of $R_1$-$R_6$, $R_{11}$-$R_{13}$, and $R_{21}$-$R_{23}$ is selected from hydrogen, a halogen, and a substituted/unsubstituted hydrocarbyl group having 1-20 atoms.

The process includes forming a procatalyst composition composed of a magnesium moiety, a titanium moiety, and the amide ester (the internal electron donor). In other words, the process produces a reaction product of the procatalyst precursor, the halogenating agent and the amide ester. The process produces a procatalyst composition with improved activity and/or improved selectivity. Applicants have surprisingly discovered that pre-halogenation (i.e., pre-chlorinating) of the procatalyst precursor unexpectedly reduces decomposition of the amide ester, once amide ester donor is added into the reaction mixture. The present process surprisingly produces a procatalyst/catalyst composition with improved activity and/or improved selectivity. Bounded by no particular theory, it is believed that the pre-halogenation unexpectedly reduces or prevents the decomposition of the amide ester during halogenation and preserves the structure of the amide ester.

In an embodiment, the process includes pre-halogenating a MagTi precursor with a halogenating agent and subsequently reacting the halogenated MagTi intermediate with an amide ester in the reaction mixture to form a procatalyst composition. The procatalyst composition includes a magnesium moiety, a titanium moiety, and an internal electron donor (the amide ester).

In an embodiment, the process includes reacting the amide ester with a BenMag precursor in the presence of titanium tetrachloride in the reaction mixture to form a procatalyst composition. The procatalyst composition includes a magnesium moiety, a titanium moiety, and an internal electron donor—i.e., a reaction product of the amide ester, the BenMag precursor, and the titanium tetrachloride. The BenMag precursor is a pre-halogenated procatalyst precursor. In other words, during synthesis of the BenMag precursor, alkoxide moiety is halogenated and converted to halide form prior to reaction or contact with the amide ester. In this way, the BenMag precursor is a pre-halogenated procatalyst precursor, and is pre-halogenated prior to being added to the reaction mixture. In an embodiment, the BenMag precursor has an alkoxide content from about 0 wt % to less than 0.5 wt %, or from about 0.1 wt % to about 0.3 wt %, based on the total weight of the BenMag precursor.

In an embodiment an electron donor component is added to the reaction mixture. An "electron donor component" is a composition, other than the amide ester, that donates a pair of electrons to one or more metals present in the resultant procatalyst composition. The electron donor component is reacted with the procatalyst precursor (which is optionally pre-halogenated), the amide ester, and optionally a halogenating agent. This forms a procatalyst composition composed of a magnesium moiety, a titanium moiety, the amide ester and the electron donor component (i.e., a reaction product of the procatalyst precursor, the halogenating agent the amide ester, and the electron donor component). In an embodiment, the electron donor component is a benzoate of structure (IV). Nonlimiting examples of suitable electron donor components are benzoates, such as ethyl benzoate (EB) and/or methoxypropan-2-yl benzoate (MPB).

The electron donor component is introduced to the reaction mixture (i) prior to, or (ii) simultaneously with (or substantially simultaneously with), the amide ester addition. In an embodiment, the electron donor component is introduced to the reaction mixture prior to the addition of the amide ester to the reaction mixture. The electron donor component may be added to the reaction mixture prior to or with the halogenating agent. Benzoate is a decomposition product of the amide ester internal electron donor. Bounded by no particular theory, it is believed the presence of the added benzoate in the reaction mixture prior to, or concomitantly with, the amide ester advantageously shifts the reaction equilibrium to disfavor decomposition of the amide ester. In this way, the electron donor component mitigates the problem of amide ester decomposition and promotes preservation of the amide ester in the resultant procatalyst composition.

The process may comprise two or more embodiments disclosed herein.

The present disclosure provides a procatalyst composition. In an embodiment, a procatalyst composition is provided and includes a combination of a magnesium moiety, a titanium moiety and a mixed internal electron donor. As used herein, a "mixed internal electron donor" is (i) an amide ester, (ii) an electron donor component, and (iii) optionally other components. In other words, the procatalyst composition is a reaction product of a procatalyst precursor, an optional halogenating agent, an amide ester, and an electron donor component. The procatalyst composition with the mixed internal electron donor can be produced by way of the procatalyst production procedure as previously disclosed.

The internal electron donor includes the amide ester and an electron donor component. The amide ester can be any amide ester with structure (I) or structure (II) as previously disclosed herein. The electron donor component may be any benzoate of structure (IV) as previously disclosed herein.

In an embodiment, the electron donor component is a benzoate, such as ethyl benzoate and/or methoxypropan-2-yl benzoate.

The procatalyst composition has a titanium content of from about 1.0 percent by weight to about 6.0 percent by weight, based on the total solids weight, or from about 1.5 percent by weight to about 5.5 percent by weight, or from about 2.0 percent by weight to about 5.0 percent by weight. The weight ratio of titanium to magnesium in the solid procatalyst composition is suitably between about 1:3 and about 1:160, or between about 1:4 and about 1:50, or between about 1:6 and 1:30. The amide ester is present in an amount from about 0.1 wt % to about 20.0 wt %, or from about 1.0 wt % to about 15 wt %. The amide ester may be present in the procatalyst composition in a molar ratio of internal electron donor to magnesium of from about 0.005:1 to about 1:1, or from about 0.01:1 to about 0.4:1. Weight percent is based on the total weight of the procatalyst composition.

In an embodiment, the procatalyst composition includes from about 0.5 wt % to about 10 wt % electron donor component, such as benzoate.

Alkoxide content, such as ethoxide content in the procatalyst composition indicates the completeness of conversion of precursor metal ethoxide into a metal halide. The amide ester and the electron donor component assist in converting ethoxide into halide during halogenation. In an embodiment, the procatalyst composition includes from about 0.01 wt % to about 1.0 wt %, or from about 0.05 wt % to about 0.5 wt % ethoxide. Weight percent is based on the total weight of the procatalyst composition.

In an embodiment, the procatalyst composition is phthalate-free.

The present procatalyst composition may comprise two or more embodiments disclosed herein.

In an embodiment, a catalyst composition is provided. As used herein, "a catalyst composition" is a composition that forms an olefin-based polymer when contacted with an olefin under polymerization conditions. The catalyst composition includes a procatalyst composition and a cocatalyst. The procatalyst composition can be any of the foregoing procatalyst compositions with an amide ester internal donor of structure (I) or structure (II) with or without an electron donor component as previously disclosed herein. The catalyst composition may optionally include an external electron donor and/or an activity limiting agent.

The catalyst composition includes a cocatalyst. As used herein, a "cocatalyst" is a substance capable of converting the procatalyst to an active polymerization catalyst. The cocatalyst may include hydrides, alkyls, or aryls of aluminum, lithium, zinc, tin, cadmium, beryllium, magnesium, and combinations thereof. In an embodiment, the cocatalyst is a hydrocarbyl aluminum compound represented by the formula $R_nAlX_{3-n}$ wherein n=1, 2, or 3, R is an alkyl, and X is a halide or alkoxide. Nonlimiting examples of suitable cocatalyst include trimethylaluminum, triethylaluminum, triisobutylaluminum, and tri-n-hexylaluminum.

In an embodiment, the cocatalyst is triethylaluminum. The molar ratio of aluminum to titanium is from about 5:1 to about 500:1, or from about 10:1 to about 200:1, or from about 15:1 to about 150:1, or from about 20:1 to about 100:1, or from about 30:1 to about 60:1. In another embodiment, the molar ratio of aluminum to titanium is about 35:1.

In an embodiment, the present catalyst composition includes an external electron donor. As used herein, an "external electron donor" (or "EED") is a compound added independent of procatalyst formation and includes at least one functional group that is capable of donating a pair of electrons to a metal atom. A "mixed external electron donor" (or "MEED") is a mixture of two or more external electron donors. Bounded by no particular theory, it is believed that provision of one or more external electron donors in the catalyst composition effects the following properties of the formant polymer: level of tacticity (i.e., xylene soluble material), molecular weight (i.e., melt flow), molecular weight distribution (MWD), melting point, and/or oligomer level.

In an embodiment, the external electron donor may be selected from one or more of the following: a silicon compound, a bidentate compound, an amine, an ether, a carboxylate, a ketone, an amide, a carbamate, a phosphine, a phosphate, a phosphite, a sulfonate, a sulfone, a sulfoxide, and any combination of the foregoing.

In an embodiment, the EED is a silicon compound having the general formula (III):

$$SiR_m(OR')_{4-m} \qquad (III)$$

wherein R independently each occurrence is hydrogen or a hydrocarbyl or an amino group, optionally substituted with one or more substituents containing one or more Group 14, 15, 16, or 17 heteroatoms. R contains up to 20 atoms not counting hydrogen and halogen. R' is a $C_{1-20}$ alkyl group, and m is 0, 1, or 2. In an embodiment, R is $C_{6-12}$ aryl, alkylaryl or aralkyl, $C_{3-12}$ cycloalkyl, $C_{1-20}$ linear alkyl or alkenyl, $C_{3-12}$ branched alkyl, or $C_{2-12}$ cyclic amino group, R' is $C_{1-4}$ alkyl, and m is 1 or 2.

Nonlimiting examples of suitable silicon compounds for the EED include dialkoxysilanes, trialkoxysilanes, and tetraalkoxysilanes such as dicyclopentyldimethoxysilane (DCPDMS), diisopropyldimethoxysilane, bis(perhydroisoquinolino)dimethoxysilane, methylcyclohexyldimethoxysilane, tetraethoxysilane, n-propyltrimethoxysilane, n-propyltriethoxysilane, diethylaminotriethoxysilane, bis(trimethylsilylmethyl)dimethoxysilane, and any combination thereof.

In an embodiment, the EED is a bidentate compound. A "bidentate compound" is a molecule or compound that contains at least two oxygen-containing functional groups separated by a $C_2$-$C_{10}$ hydrocarbon chain, the oxygen-containing functional groups being the same or different and at least one oxygen-containing functional group being an ether group or a carboxylate group, the bidentate composition excluding phthalates. Nonlimiting examples of suitable oxygen-containing functional groups for the bidentate composition include carboxylate, carbonate, ketone, ether, carbamate, amide, sulfoxide, sulfone, sulfonate, phosphite, phosphinate, phosphate, phosphonate, and phosphine oxide. One or more carbon atoms in the $C_2$-$C_{10}$ chain may be substituted with heteroatoms from Group 14, 15, and 16. One or more H atoms in the $C_2$-$C_{10}$ chain may be substituted with alkyl, cycloalkyl, alkenyl, cycloalkenyl, aryl, alkylaryl, aralkyl, halogen, or functional groups containing a heteroatom from Group 14, 15, or 16. Nonlimiting examples of suitable bidentate compounds include diethers, succinates, dialkoxybenzenes, alkoxy ester, and/or diol esters.

In an embodiment, the bidentate compound is a diether such as 3,3-bis(methoxymethyl)-2,5-dimethylhexane, 4,4-bis(methoxymethyl)-2,6-dimethylheptane, and 9,9-bis(methoxymethyl)fluorene.

In an embodiment, the bidentate compound is a diol ester such as 2,4-pentanediol di(benzoate), 2,4-pentanediol di(2-methylbenzoate), 2,4-pentanediol di(4-n-butylbenzoate), 2,2,4-trimethyl-1,3-pentanediol diisobutyrate and/or 2,2,4-trimethyl-1,3-pentanediol dibenzoate.

In an embodiment, the carboxylate is a benzoate such as ethyl benzoate and ethyl 4-ethoxybenzoate.

In an embodiment the external electron donor is a phosphite such as trimethyl phosphate, triethyl phosphate, and/or tri-n-propyl phosphite.

In an embodiment, the external electron donor is an alkoxy ester such as methyl 1-methoxybicylco[2.2.1]-hept-5-ene-2-carboxylate, methyl 3-methoxypropionate, methyl 3-methoxy-2-methylpropanoate, and/or ethyl 3-methoxy-2-methylpropanoate.

In an embodiment, the external electron donor is a succinate such as diethyl 2,3-diisopropylsuccinate, di-n-butyl 2,3-diisopropylsuccinate, and/or diethyl 2,3-diisobutylsuccinate.

In an embodiment, the external electron donor is a dialkoxybenzene such as 1,2-diethoxybenzene, 1,2-di-n-butoxybenzene, and/or 1-ethoxy-2-n-pentoxybenzene.

In an embodiment, the external electron donor is an amine such as 2,2,6,6-tetramethylpiperidine.

It is further understood that the EED may be a MEED which may comprise two or more of any of the foregoing EED compounds.

In an embodiment, the catalyst composition includes an activity limiting agent (ALA). As used herein, an "activity limiting agent" ("ALA") is a material that reduces catalyst activity at elevated temperature (i.e., temperature greater than about 85° C.). An ALA inhibits or otherwise prevents polymerization reactor upset and ensures continuity of the polymerization process. Typically, the activity of Ziegler-Natta catalysts increases as the reactor temperature rises. Ziegler-Natta catalysts also typically maintain high activity near the softening point temperature of the polymer produced. The heat generated by the exothermic polymerization reaction may cause polymer particles to form agglomerates and may ultimately lead to disruption of continuity for the polymer production process. The ALA reduces catalyst activity at elevated temperature, thereby preventing reactor upset, reducing (or preventing) particle agglomeration, and ensuring continuity of the polymerization process.

The ALA may or may not be a component of the EED and/or the MEED. The activity limiting agent may be a carboxylic acid ester, a diether, a poly(alkene glycol), a succinate, a diol ester, and combinations thereof. The carboxylic acid ester can be an aliphatic or aromatic, mono- or polycarboxylic acid ester. Nonlimiting examples of suitable carboxylic acid esters include benzoates, $C_{1-40}$ alkyl esters of aliphatic $C_{2-40}$ mono-/di-carboxylic acids, $C_{2-40}$ mono-/polycarboxylate derivatives of $C_{2-100}$ (poly)glycols, $C_{2-100}$ (poly)glycol ethers, and any combination thereof. Further nonlimiting examples of carboxylic acid esters include laurates, myristates, palmitates, stearates, oleates, and sebacates, and mixtures thereof. In a further embodiment, the ALA is ethyl 4-ethoxybenzoate or isopropyl myristate or di-n-butyl sebacate.

The catalyst composition may include any of the foregoing external electron donors in combination with any of the foregoing activity limiting agents. The external electron donor and/or activity limiting agent can be added into the reactor separately. Alternatively, the external electron donor and the activity limiting agent can be mixed together in advance and then added to the catalyst composition and/or into the reactor as a mixture. In the mixture, more than one external electron donor or more than one activity limiting agent can be used. Nonlimiting examples of suitable EED/ALA mixtures include dicyclopentyldimethoxysilane and isopropyl myristate, dicyclopentyldimethoxysilane and poly(ethylene glycol) laurate, diisopropyldimethoxysilane and isopropyl myristate, methylcyclohexyldimethoxysilane and isopropyl myristate, methylcyclohexyldimethoxysilane and ethyl 4-ethoxybenzoate, n-propyltrimethoxysilane and isopropyl myristate, dimethyldimethoxysilane and methylcyclohexyldimethoxysilane and isopropyl myristate, dicyclopentyldimethoxysilane and tetraethoxysilane and isopropyl myristate, dicyclopentyldimethoxysilane and tetraethoxysilane and ethyl 4-ethoxybenzoate, dicyclopentyldimethoxysilane and n-propyltriethoxysilane and isopropyl myristate, diisopropyldimethoxysilane and n-propyltriethoxysilane and isopropyl myristate, dicyclopentyldimethoxysilane and isopropyl myristate and poly(ethylene glycol) dioleate, dicyclopentyldimethoxysilane and diisopropyldimethoxysilane and n-propyltriethoxysilane and isopropyl myristate, and combinations thereof.

The present catalyst composition may comprise two or more embodiments disclosed herein.

In an embodiment, a process for producing an olefin-based polymer is provided. The process includes contacting an olefin with a catalyst composition under polymerization conditions. The catalyst composition includes a procatalyst composition with an amide ester internal donor with or without an electron donor component as previously disclosed herein. The amide ester can be any amide ester as disclosed herein.

The electron donor component can be any electron donor component disclosed herein. The process further includes forming an olefin-based polymer.

The catalyst composition includes a procatalyst composition and a cocatalyst. The procatalyst composition is any procatalyst composition disclosed herein and includes an amide ester of structure (I) or structure (II) with or without an electron donor component of structure (IV). The cocatalyst may be any cocatalyst as disclosed herein. The catalyst composition may optionally include an external electron donor and/or an activity limiting agent as previously disclosed.

The olefin-based polymer contains an amide ester corresponding to the internal electron donor of structure (I) or structure (II) present in the procatalyst composition. The olefin-based polymer also includes a benzoate corresponding to the benzoate of the electron donor component. In an embodiment, the olefin-based polymer can be a propylene-based olefin, an ethylene-based olefin, and combinations thereof. In an embodiment, the olefin-based polymer is a propylene-based polymer.

One or more olefin monomers can be introduced into a polymerization reactor to react with the catalyst and to form a polymer, or a fluidized bed of polymer particles. Nonlimiting examples of suitable olefin monomers include ethylene, propylene, $C_{4-20}$ α-olefins, such as 1-butene, 1-pentene, 1-hexene, 4-methyl-1-pentene, 1-heptene, 1-octene, 1-decene, 1-dodecene and the like.

As used herein, "polymerization conditions" are temperature and pressure parameters within a polymerization reactor suitable for promoting polymerization between the catalyst composition and an olefin to form the desired polymer. The polymerization process may be a gas phase, a slurry, or a bulk polymerization process, operating in one, or more than one, polymerization reactor. Accordingly, the polymerization reactor may be a gas phase polymerization reactor, a liquid-phase polymerization reactor, or a combination thereof.

It is understood that provision of hydrogen in the polymerization reactor is a component of the polymerization conditions. During polymerization, hydrogen is a chain transfer agent and affects the molecular weight (and correspondingly the melt flow rate) of the resultant polymer. The polymerization process may include a pre-polymerization step and/or a pre-activation step.

In an embodiment, the process includes mixing the external electron donor (and optionally the activity limiting agent) with the procatalyst composition. The external electron donor and/or the activity limiting agent can be complexed with the cocatalyst and mixed with the procatalyst composition (pre-mix) prior to contact between the catalyst composition and the olefin. In another embodiment, the external electron donor and/or the activity limiting agent can be added independently to the polymerization reactor.

In an embodiment, the olefin is propylene and optionally ethylene and/or 1-butene. The process includes forming a propylene-based polymer (propylene homopolymer or propylene copolymer) having one or more of the following properties:

a melt flow rate (MFR) from about 0.01 g/10 min to about 800 g/10 min, or from about 0.1 g/10 min to about 200 g/10 min, or from about 0.5 g/10 min to about 150 g/10 min, or from about 1 g/10 min to about 70 g/10 min;

a xylene solubles content from about 0.5% to about 10%, or from about 1% to about 8%, or from about 1% to about 4%;

a polydispersity index (PDI) from about 5.0 to about 20.0, or from about 6.0 to about 15, or from about 6.5 to about 10, or from about 7.0 to about 9.0;

when a comonomer is present it is present in an amount from about 0.001 wt % to about 20 wt %, or from about 0.01 wt % to about 15 wt %, or from about 0.1 wt % to about 10 wt % (based on total weight of the polymer); and/or internal electron donor (amide ester) or mixed internal electron donor (amide ester and a benzoate) present from about 1 ppb to about 50 ppm, or from about 10 ppb to about 25 ppm, or from about 100 ppb to about 10 ppm.

The present disclosure provides another process for producing an olefin-based polymer. In an embodiment, a process for producing an olefin-based polymer is provided which includes contacting propylene with a catalyst composition comprising the amide ester and optionally the electron donor component to form a propylene-based polymer. The contact between the propylene and the catalyst composition occurs in a first polymerization reactor under polymerization conditions. The process further includes contacting ethylene and optionally at least one other olefin in the presence of the propylene-based polymer. The contact between the ethylene, the olefin(s), and the propylene-based polymer occurs in a second polymerization reactor under polymerization conditions and forms a propylene impact copolymer.

In an embodiment, the first reactor and the second reactor operate in series whereby the effluent of the first reactor (i.e., the propylene-based polymer) is charged to the second reactor. Additional olefin monomer is added to the second polymerization reactor to continue polymerization. Additional catalyst composition (and/or any combination of individual catalyst components—i.e., procatalyst, cocatalyst, EED, ALA) may be added to the second polymerization reactor. The additional catalyst composition/components added to the second reactor may be the same or different than the catalyst composition/components introduced in the first reactor.

In an embodiment, the propylene-based polymer produced in the first reactor is a propylene homopolymer. The propylene homopolymer is charged to the second reactor where ethylene and propylene are contacted with each other in the presence of the propylene homopolymer. This forms a propylene impact copolymer having a propylene homopolymer continuous (or matrix) phase and a discontinuous phase (or rubber phase) selected from a propylene-based copolymer (i.e., a propylene/ethylene copolymer) or an ethylene-based copolymer (i.e., an ethylene/propylene copolymer). The discontinuous phase is dispersed in the continuous phase.

The propylene impact copolymer may have an Fc value from about 1 wt % to about 50 wt %, or from about 10 wt % to about 40 wt %, or from about 20 wt % to about 30 wt %. As used herein, "fraction copolymer" ("Fc") is the weight percent of the discontinuous phase present in the heterophasic copolymer. The Fc value is based on the total weight of the propylene impact copolymer.

The propylene impact copolymer may have an Ec value from about 1 wt % to about 100 wt %, or from about 20 wt % to about 90 wt %, or from about 30 wt % to about 80 wt %, or from about 40 wt % about 60 wt %. As used herein, "ethylene content" ("Ec") is the weight percent of ethylene present in the discontinuous phase of the propylene impact copolymer. The Ec value is based on the total weight of the discontinuous (or rubber) phase.

In an embodiment, the catalyst composition has a catalyst activity greater than 20 kg/g-h to about 60 kg/g-h, or greater than 30 kg/g-h to about 55 kg/g-h. The term "catalyst activity" as used herein is the amount of polymer produced by one gram of catalyst composition in one hour.

The present processes for production olefin-based polymer may comprise two or more embodiments disclosed herein.

Definitions

All references to the Periodic Table of the Elements herein shall refer to the Periodic Table of the Elements, published and copyrighted by CRC Press, Inc., 2003. Also, any references to a Group or Groups shall be to the Groups or Groups reflected in this Periodic Table of the Elements using the IUPAC system for numbering groups. Unless stated to the contrary, implicit from the context, or customary in the art, all parts and percents are based on weight. For purposes of United States patent practice, the contents of any patent, patent application, or publication referenced herein are hereby incorporated by reference in their entirety (or the equivalent US version thereof is so incorporated by reference), especially with respect to the disclosure of synthetic techniques, definitions (to the extent not inconsistent with any definitions provided herein) and general knowledge in the art.

Any numerical range recited herein, includes all values from the lower value to the upper value, in increments of one unit, provided that there is a separation of at least 2 units between any lower value and any higher value. As an example, if it is stated that the amount of a component, or a value of a compositional or a physical property, such as, for example, amount of a blend component, softening temperature, melt index, etc., is between 1 and 100, it is intended that all individual values, such as, 1, 2, 3, etc., and all subranges, such as, 1 to 20, 55 to 70, 197 to 100, etc., are expressly enumerated in this specification. For values which are less than one, one unit is considered to be 0.0001, 0.001, 0.01 or 0.1, as appropriate. These are only examples of what is specifically intended, and all possible combinations of numerical values between the lowest value and the highest value enumerated, are to be considered to be expressly stated in this application. In other words, any numerical range recited herein includes any value or subrange within the stated range. Numerical ranges have been recited, as discussed herein, reference melt index, melt flow rate, and other properties.

The term "alkyl," as used herein, refers to a branched or unbranched, saturated or unsaturated acyclic hydrocarbon radical. Nonlimiting examples of suitable alkyl radicals include, for example, methyl, ethyl, n-propyl, i-propyl, n-butyl, t-butyl, i-butyl (or 2-methylpropyl), etc. The alkyls have 1 to 20 carbon atoms.

The term "aryl" or "aryl group," as used herein, is a substituent derived from an aromatic hydrocarbon compound. An aryl group has a total of from six to twenty ring atoms, and has one or more rings which are separate or fused, and may be substituted with alkyl and/or halo groups. The aromatic ring(s) may include phenyl, naphthyl, anthracenyl, and biphenyl, among others.

The term "arylalkyl" or "arylalkyl group," as used herein, is a compound containing both aliphatic and aromatic structures. The term "arylalkyl group" includes "aralkyl groups" (an alkyl group substituted by at least one aryl group) and/or "alkylaryl groups" (an aryl group substituted by at least one alkyl group).

The terms "blend" or "polymer blend," as used herein, is a blend of two or more polymers. Such a blend may or may not be miscible (not phase separated at molecular level). Such a blend may or may not be phase separated. Such a blend may or may not contain one or more domain configurations, as determined from transmission electron spectroscopy, light scattering, x-ray scattering, and other methods known in the art.

The term "composition," as used herein, includes a mixture of materials which comprise the composition, as well as reaction products and decomposition products formed from the materials of the composition.

The term "comprising," and derivatives thereof, is not intended to exclude the presence of any additional component, step or procedure, whether or not the same is disclosed herein. In order to avoid any doubt, all compositions claimed herein through use of the term "comprising" may include any additional additive, adjuvant, or compound whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or", unless stated otherwise, refers to the listed members individually as well as in any combination.

The term, "ethylene-based polymer," as used herein, is a polymer that comprises a majority weight percent polymerized ethylene monomer (based on the total weight of polymerizable monomers), and optionally may comprise at least one polymerized comonomer.

The term "olefin-based polymer" is a polymer containing, in polymerized form, a majority weight percent of an olefin, for example ethylene or propylene, based on the total weight of the polymer. Nonlimiting examples of olefin-based polymers include ethylene-based polymers and propylene-based polymers.

The term "polymer" is a macromolecular compound prepared by polymerizing monomers of the same or different type. "Polymer" includes homopolymers, copolymers, terpolymers, interpolymers, and so on. The term "interpolymer" is a polymer prepared by the polymerization of at least two types of monomers or comonomers. It includes, but is not limited to, copolymers (which usually refers to polymers prepared from two different types of monomers or comonomers, terpolymers (which usually refers to polymers prepared from three different types of monomers or comonomers), tetrapolymers (which usually refers to polymers prepared from four different types of monomers or comonomers), and the like.

The term, "propylene-based polymer," as used herein, is a polymer that comprises a majority weight percent polymerized propylene monomer (based on the total amount of polymerizable monomers), and optionally may comprise at least one polymerized comonomer.

The term "substituted alkyl," as used herein, is an alkyl as previously defined described in which one or more hydrogen atom bound to any carbon of the alkyl is replaced by another group such as a halogen, aryl, substituted aryl, cycloalkyl, substituted cycloalkyl, heterocycloalkyl, substituted heterocycloalkyl, haloalkyl, hydroxy, amino, phosphido, alkoxy, amino, thio, nitro, silyl, and combinations thereof. Suitable substituted alkyls include, for example, benzyl, trifluoromethyl and the like.

Test Methods

Melt flow rate (MFR) is measured in accordance with ASTM D 1238-01 test method at 230° C. with a 2.16 kg weight for propylene-based polymers.

Xylene Solubles (XS) is the weight percent of resin that stays in the solution after the resin is dissolved in hot xylene and the solution is allowed to cool to 25° C. (Gravimetric XS method according to ASTM D5492-06). XS is measured according to one of the two following procedures: (1) Viscotek method: 0.4 g of polymer is dissolved in 20 ml of xylenes with stirring at 130° C. for 30 minutes. The solution is then cooled to 25° C. and after 30 minutes the insoluble polymer fraction is filtered off. The resulting filtrate is analyzed by Flow Injection Polymer Analysis using a Viscotek ViscoGEL H-100-3078 column with THF mobile phase flowing at 1.0 ml/min. The column is coupled to a Viscotek Model 302 Triple Detector Array, with light scattering, viscometer and refractometer detectors operating at 45° C. Instrument calibration was maintained with Viscotek PolyCAL™ polystyrene standards. (2) NMR method: XS is measured using a $^1$H NMR method as described in U.S. Pat. No. 5,539,309, the entire content of which is incorporated herein by reference. Both of the methods are calibrated against the gravimetric ASTM method.

Polydispersity Index (PDI) is measured by an AR-G2 rheometer which is a stress control dynamic spectrometer manufactured by TA Instruments using a method according to Zeichner GR, Patel PD (1981) "A comprehensive Study of Polypropylene Melt Rheology", Proc. of the $2^{nd}$ World Congress of Chemical Eng., Montreal, Canada. An ETC oven is used to control the temperature at 180° C.±0.1° C. Nitrogen is used to purge the inside the oven to keep the sample from degradation by oxygen and moisture. A pair of 25 mm in diameter cone and plate sample holder is used. Samples are compress molded into 50 mm×100 mm×2 mm plaque. Samples are then cut into 19 mm square and loaded on the center of the bottom plate. The geometries of upper cone is (1) Cone angle: 5:42:20 (deg:min:sec); (2) Diameter: 25 mm; (3) Truncation gap: 149 micron. The geometry of the bottom plate is 25 mm cylinder.

Testing Procedure:
(1) The cone & plate sample holder is heated in the ETC oven at 180° C. for 2 hours. Then the gap is zeroed under blanket of nitrogen gas.
(2) Cone is raised to 2.5 mm and sample loaded unto the top of the bottom plate.
(3) Start timing for 2 minutes.
(4) The upper cone is immediately lowered to slightly rest on top of the sample by observing the normal force.
(5) After two minutes the sample is squeezed down to 165 micron gap by lower the upper cone.
(6) The normal force is observed. When the normal force is down to <0.05 Newton the excess sample is removed from the edge of the cone and plate sample holder by a spatula.
(7) The upper cone is lowered again to the truncation gap which is 149 micron.
(8) An Oscillatory Frequency Sweep test is performed under these conditions:
  (i) Test delayed at 180° C. for 5 minutes.
  (ii) Frequencies: 628.3 r/s to 0.1 r/s.
  (iii) Data acquisition rate: 5 point/decade.
  (iv) Strain: 10%
(9) When the test is completed the crossover modulus (Gc) is detected by the Rheology Advantage Data Analysis program furnished by TA Instruments.
(10) PDI=100,000÷Gc (in Pa units).

Final melting point ($T_{MF}$) is the temperature to melt the most perfect crystal in the sample and is a measure for isotacticity and inherent polymer crystallizability. The test is conducted using a TA Q100 Differential Scanning calorimeter. A sample is heated from 0° C. to 240° C. at a rate of 80° C./min, cooled at the same rate to 0° C., then heated again at the same rate up to 150° C., held at 150° C. for 5 minutes and the heated from 150° C. to 180° C. at 1.25° C./min. The $T_{MF}$ is determined from this last cycle by calculating the onset of the baseline at the end of the heating curve.

Testing Procedure:
(1) Calibrate instrument with high purity indium as standard.
(2) Purge the instrument head/cell with a constant 50 ml/min flow rate of nitrogen constantly.
(3) Sample preparation:
  Compression mold 1.5 g of powder sample using a 30-G302H-18-CX Wabash Compression Molder (30 ton): (a) heat mixture at 230° C. for 2 minutes at contact; (b) compress the sample at the same temperature with 20 ton pressure for 1 minute; (c) cool the sample to 45° F. and hold for 2 minutes with 20 ton pressure; (d) cut the plaque into 4 of about the same size, stack them together, and repeat steps (a)-(c) in order to homogenize sample.
(4) Weigh a piece of sample (preferably between 5 to 8 mg) from the sample plaque and seal it in a standard aluminum sample pan. Place the sealed pan containing the sample on the sample side of the instrument head/cell and place an empty sealed pan in the reference side. If using the auto sampler, weigh out several different sample specimens and set up the machine for a sequence.
(5) Measurements:
  (i) Data storage: off
  (ii) Ramp 80.00° C./min to 240.00° C.
  (iii) Isothermal for 1.00 min
  (iv) Ramp 80.00° C./min to 0.00° C.
  (v) Isothermal for 1.00 min
  (vi) Ramp 80.00° C./min to 150.00° C.
  (vii) Isothermal for 5.00 min
  (viii) Data storage: on
  (ix) Ramp 1.25° C./min to 180.00° C.
  (x) End of method
(6) Calculation: $T_{MF}$ is determined by the interception of two lines. Draw one line from the base-line of high temperature. Draw another line from through the deflection of the curve close to the end of the curve at high temperature side.

By way of example and not by limitation examples of the present disclosure will now be provided.

EXAMPLES

1. Synthesis of Amide Ester

Ethyl 2-cyano-2-isobutyl-4-methylpentanoate, and ethyl 2-cyano-2-isopropyl-3-methylbutyrate

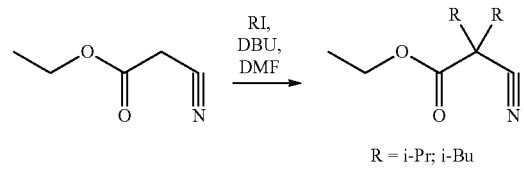

R = i-Pr; i-Bu

A 500-ml round-bottom flask is fit with magnetic stirrer, and is charged with ethyl 2-cyanoacetate (11.3 g, 0.1 mol) and anhydrous DMF (120 ml). To the stirred solution a solution of 1,8-diazabycyclo[5.4.0]undec-7-ene (DBU) (30.4 g, 0.2 mol, 1.0 equiv.) in anhydrous DMF (40 ml) is added dropwise. After the completion of addition, the mixture is stirred for another hour. The flask is cooled in an ice-water bath, and a solution of the iodide (0.2 mol, 1.0 equiv.) in DMF (40 ml) is added dropwise. The mixture is raised to room temperature and stirred for another 14 hours until all starting material is converted into the product (monitored by GC). The mixture is poured into ice-water, and extracted with diethyl ether. The combined ether extract is washed with water and brine, dried over magnesium sulfate. After filtration, the filtrate concentrated, and the residue is distilled in vacuo to yield the product as colorless liquid.

Ethyl 2-cyano-2-isopropyl-3-methylbutyrate: Yield 67%; $^1$H NMR: δ 4.24 (q, 2H, J=7.0 Hz), 2.28 (heptat, 2H, J=7.0 Hz) 1.30 (t, 3H, J=7.0 Hz), 1.07 (d, 6H, J=7.0 Hz), 1.01 (d, 6H, J=6.5 Hz).

Ethyl 2-cyano-2-isobutyl-4-methylpentanoate: Yield 88%; $^1$H NMR: δ 4.26 (q, 2H, J=7.0 Hz), 1.82-1.90 (m, 4H), 1.63-1.70 (m, 2H), 1.34 (t, 3H, J=7.0 Hz), 1.04 (d, 6H, J=6.0 Hz), 0.89 (d, 6H, J=6.0 Hz).

2,2-Disubtituted 3-aminopropanols

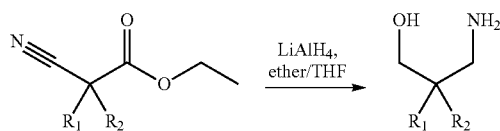

A nitrogen purged 1000-ml three-neck round bottom flask is fit with magnetic stirrer, condenser, and dropping funnel. Powered lithium aluminum hydride (0.14~0.18 mol) is added followed by anhydrous THF (140~180 ml), which can be replaced by commercial 1.0 M lithium aluminum hydride in THF. While stirred, a solution of the ethyl 2-cyanocarboxylate compound (0.06~0.08 mol) in ether (~200 ml) is added dropwise to keep the mixture in gentle reflux. Upon the completion of addition, the mixture is heated to gentle reflux for 3 hours. After being cooled down, the flask is put in an ice-water bath. Water is carefully added, and the mixture is stirred until the solid turned white. After filtration, the solid is washed with additional ether, the filtrate concentrated, and the residue dried in vacuo to yield the product as a white solid or sticky oil which can be used directly in acylation reactions without further purification.

2-Aminomethyl-2-isopropyl-3-methylbutan-1-ol: Yield 71%; $^1$H NMR: δ 3.72 (s, 2H), 2.93 (s, 2H), 2.65 (br.s, 3H), 1.97 (heptat, 2H, J=8.8 Hz), 0.95 (d, 6H, J=8.5 Hz), 0.94 (d, 6H, J=9.0 Hz).

2-Aminomethyl-2-isobutyl-4-methylpentan-1-ol: Yield 75%; $^1$H NMR: δ 3.54 (s, 2H), 2.77 (s, 2H), 2.65 (br.s, 3H), 1.58-1.70 (m, 2H), 1.21 (d, 2H, J=7.0 Hz), 1.20 (d, 2H, J=7.5 Hz), 0.88 (d, 6H, J=8.0 Hz), 0.87 (d, 6H, J=8.5 Hz).

4-Aminopentan-2-ol

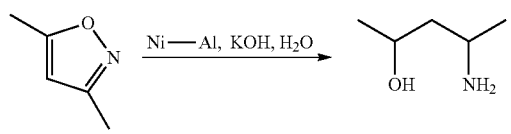

A 1000-mL round-bottom flask is charged with 3,5-dimethylisoxazole (9.7 g, 0.1 mol) and water (200 ml). To this solution is added 1.0 M aqueous potassium hydroxide (200 mL). Nickel-aluminum alloy (1:1, 32 g, 0.2 mol) is added in portions over 1 hour. After about another two hours, the reaction mixture is filtered over celite, and the solid washed with additional water. The filtrate is extracted with methylene chloride once. The aqueous solution is acidified with concentrated HCl, and concentrated to dryness. Potassium hydroxide (10 M, 5.0 ml) is added to the residue, the mixture is extracted with methylene chloride, and the extract is dried with magnesium sulfate. After filtration, the filtrate is concentrated, the residue is dried in vacuo to yield 9.0 g (87%) of the product as a sticky oil, which is used directly in the following acylation reaction. $^1$H NMR (two isomers about 1:1.3): δ 4.10-4.18 (m, 1Ha), 3.95-4.00 (m, 1Hb), 3.37-3.41 (m, 1Ha), 3.00-3.05 (m, 1Hb), 2.63 (br.s, 3Ha+3Hb), 1.42-1.55 (m, 7Ha+1Hb), 1:12-1.24 (m, 6Ha+7Hb).

Acylated Aminoalcohols

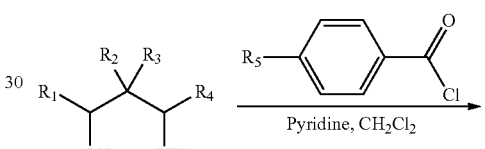

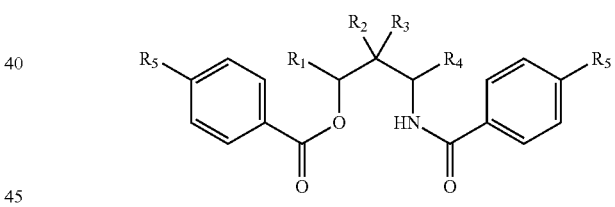

A 250-ml round bottom flask is charged with aminoalcohol (0.02 mol), pyridine (0.04 mol, 1.0 equiv.) and methylene chloride (50 ml). The flask is immersed in an ice-water bath, and benzoyl chloride (0.04 mol, 1.0 equiv.) is added dropwise. After the completion of addition, the flask is warmed up to room temperature, and the mixture is stirred overnight. Upon the completion of reaction monitored by GC, the mixture is diluted with methylene chloride, and washed with water, saturated ammonium chloride, water, saturated sodium bicarbonate, and brine, consequently. The solution is dried over magnesium sulfate, filtered, and the filtrate concentrated. The residue is purified by flash column chromatography to yield the product as a colorless oil or white solid.

$^1$H NMR data is obtained on a Brüker 500 MHz or 400 MHz NMR spectrometer using CDCl$_3$ as solvent (in ppm).

Halogenated and/or substituted amide esters produced by the foregoing synthesis are provided in Table 1 below.

TABLE 1

Amide Esters

| Compound | Structure | $^1$H NMR (CDCl$_3$ as solvent (in ppm) |
|---|---|---|
| (1) 3-benzamido-2,2-dimethylpropyl benzoate | | Yield 88%; δ 8.08 (d, 2H, J = 8.5 Hz), 8.85 (d, 2H, J = 8.0 Hz), 7.32-7.62 (m, 6H), 6.99 (t, 1H, J = 6.5 Hz), 4.23 (s, 2H), 3.38 (d, 2H, J = 6.5 Hz), 1.10 (s, 6H). |
| (2) 4-benzimidopentan-2-yl benzoate | | Yield 71% (two isomers with a ratio about 2.1 to 1); isomer 1: δ 7.96 (dd, 2H, J = 10.5, 2.0 Hz), 7.68 (dd, 2H, J = 10.5, 1.5 Hz), 7.24-7.52 (m, 6H), 6.67 (m, 1H), 5.25-5.34 (m, 1H), 4.27-4.38 (m, 1H), 1.90-2.02 (m, 2H), 1.35 (d, 3H, J = 7.5 Hz), 1.27 (d, 3H, J = 7.5 Hz); isomer 2: δ 8.05 (dd, 2H, J = 10.5, 2.0 Hz), 7.81 (dd, 2H, J = 10.0, 2.0 Hz), 7.39-7.56 (m, 6H), 6.40 (d, 1H, J = 9.5 Hz), 6.22 (qt, 1H, J = 7.5, 8.0 Hz), 4.28-4.40 (m, 1H), 2.12 (ddd, 1H, J = 7.5, 11.0, 17.5 Hz), 1.81 (ddd, 1H, J = 7.0, 8.5, 17.5 Hz), 1.44 (d, 3H, J = 8.0 Hz), 1.29 (d, 3H, J = 8.5 Hz). |
| (3) 2-(benzamidomethyl)-2-isopropyl-3-methylbutyl benzoate | | Yield 68%; δ 7.95 (dd, 2H, J = 10.0, 2.0 Hz), 7.67 (dd, 2H, J = 10.0 , 2.0 Hz), 7.30-7.55 (m, 6H), 6.63 (t, 1H, J = 6.5 Hz), 4.38 (s, 2H), 3.57 (d, 2H, J = 7.5 Hz), 2.06 (heptat, 2H, J = 8.5 Hz), 1.38-1.47 (m, 4H), 1.04 (d, 12H, J = 8.5 Hz) |
| (4) 2-(Benzamidomethyl)-2-isobutyl-4-methylpentyl benzoate | | Yield 71%; δ 8.02 (d, 2H, J = 9.5 Hz), 7.76 (d, 2H, J = 9.5 Hz), 7.39-7.60 (m, 6H), 6.84 (t, 1H, J = 7.5 Hz), 4.30 (s, 2H), 3.47 (d, 2H, J = 8.0 Hz), 1.86 (heptat, 2H, J = 7.5 Hz), 1.38-1.47 (m, 4H), 0.96 (d, 12H, J = 8.0 Hz). |
| (5) 3-(4-fluorobenzamido)-2,2-dimethylpropyl 4-fluorobenzoate | | Yield 86.5%; 8.08-8.15 (m, 2H), 7.82-7.90 (m, 2H), 7.10-7.18 (m, 4H), 6.95-7.03 (m, 1H), 4.22 (s, 2H), 3.35 (d, 2H, J = 8.0 Hz), 1.09 (s, 6H). |
| (6) 4-(4-Fluorobenzamido) pentan-2-yl 4-fluorobenzoate | | Yield 73%, containing two isomers with a ratio about 3 to 2; δ 8.06 (dd, 2Ha, J = 5.5, 9.0 Hz), 7.99 (dd, 2Hb, J = 5.5, 8.5 Hz), 7.83 (dd, 2Ha, J = 5.5, 8.5 Hz), 7.69 (dd, 2Hb, J = 5.5, 8.5 Hz), 7.01-7.15 (m, 4Ha + 4Hb), 6.40 (d, 1Ha, J = 9.0 Hz), 6.14 (d, 1Hb, J = 9.0 Hz), 5.20-5.34 (m, 1Hb), 5.18 (dt, 1Ha, J = 6.5, 6.0 Hz), 4.23-4.36 (m, 1Ha + 1Hb), 2.02-2.12 (m, 1Ha + 1Hb), 1.958 (ddd, 1Hb, J = 4.0, 8.0, 15.0 Hz), 1.79 (ddd, 1Ha, J = 5.5, 6.5, 14.0 Hz), 1.44 (d, 3Ha, J = 6.5 Hz), 1.41 (d, 3Hb, J = 6.5 Hz), 1.34 (d, 3Hb, J = 6.5 Hz), 1.28 (d, 3Ha, J = 6.5 Hz). |
| (7) 2-((4-Fluorobenzamido)methyl)-2-isopropyl-3-methylbutyl 4-fluorobenzoate | | Yield 80%; δ 8.04 (dd, 2H, J = 8.5, 5.5 Hz), 7.76 (dd, 2H, J = 8.5, 5.5 Hz), 7.12 (dd, 2H, J = 8.5, 8.5 Hz), 7.09 (dd, 2H, J = 8.0, 9.0 Hz), 6.52 (1H, J = 6.0 Hz), 4.44 (s, 2H), 3.61 (d, 2H, J = 6.0 Hz), 1.85 (heptat, 2H, J = 7.0 Hz), 1.10 (d, 6H, J = 7.0 Hz), 1.09 (d, 6H, J = 7.0 Hz). |

TABLE 1-continued

Amide Esters

| Compound | Structure | $^1$H NMR (CDCl$_3$ as solvent (in ppm) |
|---|---|---|
| (8) 2-((4-Fluorobenzamido)methyl)-2-isobutyl-4-methylpentyl 4-fluorobenzoate | | Yield 64%; δ 8.04-8.08 (m, 2H), 7.80-7.83 (m, 2H), 7.09-7.15 (m, 4H), 6.79 (t, 1H, J = 6.5 Hz), 4.31 (s, 2H), 3.45 (d, 2H, J = 6.5 Hz), 1.85 (heptat, 2H, J = 6.5 Hz), 1.38-1.46 (m, 4H), 0.99 (d, 12H, J = 6.5 Hz). |
| (9) 3-(4-Chlorobenzamido)-2,2-dimethylpropyl 4-chlorobenzoate | | Yield 80%; δ 8.00 (d, 2H, J = 11.0 Hz), 7.78 (d, 2H, J = 11.0 Hz), 7.45 (d, 2H, J = 11.0 Hz), 7.42 (d, 2H, J = 11.0 Hz), 6.97 (t, 1H, J = 8.0 Hz), 4.21 (s, 2H), 3.33 (d, 2H, J = 8.0 Hz), 1.08 (s, 6H). |
| (10) 2-((4-Chlorobenzamido)methyl)-2-isopropyl-3-methylbutyl 4-chlorobenzoate | | Yield 80%; δ 7.94 (d, 2H, J = 10.5 Hz), 7.68 (d, 2H, J = 10.5 Hz), 7.42 (d, 2H, J = 10.5 Hz), 7.39 (d, 2H, J = 10.5 Hz), 6.51 (t, 1H, J = 6.5 Hz), 4.44 (s, 2H), 3.60 (d, 2H, J = 8.0 Hz), 2.08 (heptat, 2H, J = 8.8 Hz), 1.09 (d, 6H, J = 8.5 Hz), 1.08 (d, 6H, J = 8.5 Hz). |
| (11) 2-((4-Chlorobenzamido)methyl)-2-isobutyl-4-methylphenyl 4-chlorobenzoate | | Yield 65%; δ 7.97 (d, 2H, J = 8.5 Hz), 7.73 (d, 2H, J = 8.5 Hz), 7.43 (d, 2H, J = 8.5 Hz), 7.41 (d, 2H, J = 8.5 Hz), 6.79 (t, 1H, J = 6.5 Hz), 4.31 (s, 2H), 3.44 (d, 2H, J = 6.5 Hz), 1.85 (heptat, 2H, J = 6.0 Hz), 1.38-1.46 (m, 4H), 0.99 (d, 12H, J = 7.0 Hz). |
| (12) 2,2-Dimethyl-3-(4-ethylbenzamido)propyl 4-ethylbenzoate | | Yield 56%; $^1$H NMR: δ 7.99 (d, 2H, J = 7.5 Hz), 7.78 (d, 2H, J = 8.5 Hz), 7.25-7.29 (m, 4H), 7.00 (t, 1H, J = 6.5 Hz), 4.20 (s, 2H), 3.36 (d, 2H, J = 6.5 Hz), 2.72 (q, 2H, J = 7.5 Hz), 2.70 (q, 2H, J = 7.5 Hz), 1.27 (t, 3H, J = 7.5 Hz), 1.26 (t, 3H, J = 7.5 Hz), 1.08 (s, 6H). |
| (13) 3-(4-Butylbenzamido)-2,2-dimethylpropyl 4-butylbenzoate | | Yield 57%; $^1$H NMR: δ 7.97 (d, 2H, J = 10.5 Hz), 7.76 (d, 2H, J = 10.5 Hz), 7.22-7.26 (m, 4H), 6.96 (m, 1H), 4.20 (s, 2H), 3.36 (d, 2H, J = 7.5 Hz), 2.68 (t, 2H, J = 9.5 Hz), 2.66 (t, 2H, J = 9.5 Hz), 1.57-1.66 (m, 4H), 1.31-1.41 (m, 4H), 1.08 (s, 6H), 0.933 (t, 3H, J = 9.0 Hz), 0.931 (t, 3H, J = 9.0 Hz). |

2. Procatalyst Preparation

A. General Preparation Procedure: The catalysts are prepared according to the following procedure. Catalyst synthesis for the following catalysts is set forth at section 2B: M-1-A, M-1-EB-A, M-1-MPB-A, M-1-MPB-B, M-1-MPB-C, and M-1-MPB-D.

A procatalyst precursor (according to the weight shown in Table 2 unless otherwise specified) and 2.52 mmol of internal electron donor (i.e., amide ester) are charged into a flask equipped with mechanical stirring and with bottom filtration. 60 ml of a mixed solvent of TiCl$_4$ and chlorobenzene (1/1 by volume) is introduced into the flask. The mixture is heated to 115° C. and remains at the same temperature for 60 minutes with stirring at 250 rpm before filtering off the liquid. 60 ml of mixed solvent is added again and the reaction is allowed to continue at the same desired temperature for 30 minutes with stirring followed by filtration. This process is repeated once.

70 ml of iso-octane is used to wash the resultant solid at ambient temperature. After the solvent is removed by filtration, the solid is dried by $N_2$ flow or under vacuum.

TABLE 2

| Procatalyst Precursor | Weight |
|---|---|
| MagTi-1 (M) | 3.00 g |
| Mg(OEt)$_2$ (ME) | 3.00 g |
| SHAC™ 310 (S) | 2.00 g |
| Mg(OCOEt)$_2$ (MO) | 3.44 g |

MagTi-1 (M) is a mixed Mag/Ti precursor with a composition of $Mg_3Ti(OEt)_8Cl_2$ (a MagTi precursor prepared according to example 1 in U.S. Pat. No. 6,825,146) with an average particle size of 50 micron. SHAC™ 310 (S) is a benzoate-containing catalyst (a BenMag procatalyst precursor with an average particle size of 27 micron) with ethyl benzoate as the internal electron donor made according to Example 2 in U.S. Pat. No. 6,825,146, the entire content of which is incorporated herein by reference. Mg(OCOEt)$_2$ support is made according to example 1 in U.S. Pat. No. 5,652,314. Titanium content for each of the resultant procatalyst compositions is listed in Table 3. The peaks for internal donors are assigned according to retention time from GC analysis. No additional characterization is performed.

TABLE 3

Procatalyst Compositions

| Internal Electron Donor (IED) | Procatalyst Precursor | Procatalyst # | Ti (%) | Ethyl Benzoate (%) | Internal Electron Donor (%) |
|---|---|---|---|---|---|
| DiBP* | MagTi-1 | M-DiBP | 2.99 | 0 | 12.49 |
| 1 | MagTi-1 | M-1 | 3.32 | 0.45 | trace |
|   | SHAC™ 310 | S-1 | 3.07 | 1.08 | trace |
| 2 | MagTi-1 | M-2 | 3.27 | 0.53 | trace |
| 3 | MagTi-1 | M-3 | 3.14 | 0.17 | 2.98 |
|   | SHAC™ 310 | S-3 | 3.53 | 0.93 | 1.92 |
| 4 | MagTi-1 | M-4 | 3.19 | 0.18 | 8.80 |
|   | SHAC™ 310 | S-4 | 3.29 | 0.13 | 4.59 |
| 5 | MagTi-1 | M-5 | 3.38 | 0 | trace |
|   | Mg(OEt)$_2$ | ME-5 | 3.09 | 0 | trace |
|   | SHAC™ 310 | S-5 | 3.00 | 0.39 | trace |
| 6 | MagTi-1 | M-6 | 3.01 | 0 | trace |
|   | SHAC™ 310 | S-6 | 3.12 | 0.59 | trace |
| 7 | MagTi-1 | M-7 | 2.91 | 0 | 5.11 |
|   | Mg(OEt)$_2$ | ME-7 | 4.25 | 0 | 4.13 |
|   | SHAC™ 310 | S-7 | 3.25 | 0.62 | 5.33 |
| 8 | MagTi-1[1] | M-8 | 3.52 | 0 | 9.58 |
|   | Mg(OEt)$_2$[2] | ME-8 | 4.49 | 0 | 6.07 |
|   | Mg(OCOEt)$_2$ | MO-8 | 3.83 | 0 | trace |
|   | SHAC™ 310 | S-8 | 2.72 | 0.58 | 7.72 |
| 9 | MagTi-1 | M-9 | 5.32 | 0 | trace |
|   | Mg(OEt)$_2$ | ME-9 | 5.22 | 0 | trace |
|   | SHAC™ 310 | S-9 | 2.81 | 2.89 | trace |
| 10 | MagTi-1 | M-10 | 3.47 | 0 | 1.58 |
|   | Mg(OEt)$_2$ | ME-10 | 3.98 | 0 | 5.43 |
|   | SHAC™ 310 | S-10 | 3.16 | 0.99 | 6.96 |
| 11 | MagTi-1 | M-11 | 3.97 | 0 | 1.80 |
|   | Mg(OEt)$_2$ | ME-11 | 4.34 | 0 | 3.56 |
|   | SHAC™ 310 | S-11 | 2.72 | 0.37 | 6.97 |
| 12 | MagTi-1 | M-12 | 3.46 | 0 | trace |
|   | SHAC™ 310 | S-12 | 3.35 | 1.41 | trace |
| 13 | MagTi-1 | M-13 | 3.34 | 0 | trace |
|   | SHAC™ 310 | S-13 | 1.82 | 1.24 | trace |

*DiBP = diisobutyl phthalate (comparative)
[1] 2.59 g of precursor is used
[2] 1.73 g of precursor is used.

B. Catalyst Preparation Procedures for Other Catalysts:

M-1-A and M-1-EB and M-1-MPB-A: 4.3 g MagTi-1 and 0.8 g of compound I are charged into a flask equipped with mechanical stirring and with bottom filtration. 60 ml of a mixed solvent of TiCl$_4$ and chlorobenzene (1/1 by volume) is introduced into the flask followed by addition of 0.6 ml of EB (for M-1-EB) or 1.0 ml of MPB (for M-1-MPB-A) via a syringe. The mixture is heated to 115° C. and remains at the same temperature for 60 minutes with stirring at 250 rpm before filtering off the liquid. 60 ml of mixed solvent is added again and the reaction is allowed to continue at the same desired temperature for 30 minutes with stirring followed by filtration. This process is repeated once. 70 ml of iso-octane is used to wash the resultant solid at ambient temperature. After the solvent is removed by filtration, the solid is dried by $N_2$ flow.

M-1-MPB-B: 4.3 g MagTi-1 is charged into a flask equipped with mechanical stirring and with bottom filtration. 60 ml of a mixed solvent of TiCl$_4$ and chlorobenzene (1/1 by volume) is introduced into the flask. 2 minutes later, 0.8 ml of MPB was added via a syringe. After 2 more minutes, 6.0 ml of a solution of 2.7 g of compound I in 27 g of MCB is added to the mixture. The mixture is heated to 115° C. and remains at the same temperature for 60 minutes with stirring at 250 rpm before filtering off the liquid. 60 ml of mixed solvent is added again and the reaction is allowed to continue at the same desired temperature for 30 minutes with stirring followed by filtration. This process is repeated once. 70 ml of iso-octane is used to wash the resultant solid at ambient temperature. After the solvent is removed by filtration, the solid is dried by $N_2$ flow.

M-1-MPB-C, 4.3 g MagTi-1 are charged into a flask equipped with mechanical stirring and with bottom filtration. 60 ml of a mixed solvent of TiCl$_4$ and chlorobenzene (1/1 by volume) is introduced into the flask and 0.8 ml of MPB is added. The mixture is heated to 115° C. and remains at the same temperature for 60 minutes with stirring at 250 rpm before filtering off the liquid. 60 ml of mixed solvent is added again followed by addition of 0.6 g of compound 1 (in 10 wt % MCB solution), and the reaction is allowed to continue at the same desired temperature for 30 minutes with stirring followed by filtration. This process is repeated once except that no MPB is added. 70 ml of iso-octane is used to wash the resultant solid at ambient temperature. After the solvent is removed by filtration, the solid is dried by $N_2$ flow.

M-1-MPB-D: 4.3 g MagTi-1 is charged into a flask equipped with mechanical stirring and with bottom filtration. 60 ml of a mixed solvent of TiCl$_4$ and chlorobenzene (1/1 by volume) is introduced into the flask, followed by addition of 1.0 ml of MPB via a syringe. The mixture is heated to 115° C. and remains at the same temperature for 60 minutes with stirring at 250 rpm before filtering off the liquid. 60 ml of mixed solvent is added again and the reaction is allowed to continue at the same desired temperature for 30 minutes with stirring followed by filtration. 60 ml of mixed solvent is added again followed by addition of 8.0 ml of a solution of 2.7 g of compound 1 in 27 g of MCB, and the reaction is allowed to continue at the same desired temperature for 30 minutes with stirring followed by filtration. 70 ml of iso-octane is used to wash the resultant solid at ambient temperature. After the solvent is removed by filtration, the solid is dried by $N_2$ flow.

3. Polymerization

Polymerization is performed in liquid propylene in a 1-gallon autoclave. After conditioning, the reactors are charged with 1375 g of propylene and a targeted amount of hydrogen and brought to 62° C. 0.25 mmol of dicyclopentyldimethoxysilane (DCPDMS) is added to 7.2 ml of a 0.27 M triethylaluminum solution in isooctane, followed by addition of a 5.0 wt % procatalyst slurry in mineral oil (actual solid weight is indicated in data tables below). The mixture is premixed at ambient temperature for 20 minutes before being injected into the reactor to initiate the polymerization. The premixed catalyst components are flushed into the reactor with isooctane using a high pressure catalyst injection pump. After the exotherm, the temperature is controlled to 67° C. Total polymerization time is 1 hour.

4. Polymer Testing

Polymer samples are tested for settled bulk density, melt flow rate (MFR), xylene solubles (XS), polydispersity index (PDI), and final melting point ($T_{MF}$). Unless specified, XS are measured using Viscotek method.

TABLE 4

Catalyst Performance with Amide Ester Internal Electron Donor and Additional Internal Donor from Procatalyst Precursors and Polymer Properties

| Internal Electron Donor | Procatalyst Precursor | Run # | Procatalyst # | Procatalyst (mg) | $H_2$ (scc) | Activity (kg/g-hr) | Activity (kg/g-hr) | BD (g/cc) | MFR (g/10 min) | XS (%) | PDI | $T_{MF}$ (° C.) |
|---|---|---|---|---|---|---|---|---|---|---|---|---|
| DiBP | MagTi-1 | E-1** | M-DiBP | 16.7 | 1500 | 28.6 | 34.4 | 0.40 | 2.5 | 2.98 | 4.81 | 171.48 |
| 1 | MagTi-1 | E-2** | M-1 | 16.7 | 4500 | 7.5 | 8.2 | 0.29 | 4.0 | 4.50 | 8.24 | 170.26 |
|  | SHAC™ 310 | E-3 | S-1 | 16.7 | 3000 | 12.5 | 12.8 | 0.35 | 1.2 | 3.50* | 9.00 | 171.64 |
| 12 | MagTi-1 | E-24** | M-12 | 16.7 | 13500 | 11.6 | 12.6 | 0.28 | 10.8 | 4.68 | 6.79 | 170.03 |
|  | SHAC™ 310 | E-25 | S-12 | 16.7 | 13500 | 24.0 | 25.2 | 0.37 | 6.8 | 3.29 | 6.93 | 171.54 |
| 13 | MagTi-1 | E-26** | M-13 | 8.4 | 4500 | 16.0 | 18.1 | 0.28 | 2.4 | 4.01 | 6.42 | 170.88 |
|  | SHAC™ 310 | E-27 | S-13 | 8.4 | 4500 | 43.3 | 46.4 | 0.40 | 1.3 | 3.29 |  | 171.24 |
| 5 | MagTi-1 | E-10** | M-5 | 16.7 | 4500 | 6.2 | 7.7 | 0.35 | 8.1 | 5.02 | 7.81 | 170.28 |
|  | Mg(OEt)$_2$ | E-28** | ME-5 | 16.7 | 4500 | 7.2 | 8.8 | 0.27 | 14.8 | 6.09 |  |  |
|  | SHAC™ 310 | E-11 | S-5 | 16.7 | 4500 | 18.9 | 19.9 | 0.37 | 3.7 | 5.16 | 9.61 | 170.30 |
| 9 | MagTi-1 | E-18** | M-9 | 16.7 | 1500 | 5.5 | 5.7 | 0.29 | 12.7 | 9.74 | 6.98 | 169.03 |
|  | Mg(OEt)$_2$ | E-29** | ME-9 | 16.7 | 1500 | 7.4 | 7.6 | 0.19 | 12.4 | 9.41 | 5.93 | 170.62 |
|  | SHAC™ 310 | E-19 | S-9 | 8.4 | 4500 | 29.0 | 33.3 | 0.37 | 3.5 | 4.77 | 8.84 | 170.67 |
| 3 | MagTi-1 | E-6** | M-3 | 16.7 | 13500 | 11.1 | 12.6 | 0.27 | 12.0 | 2.34 | 7.50 | 171.32 |
|  | SHAC™ 310 | E-7 | S-3 | 16.7 | 13500 | 21.6 | 22.7 | 0.38 | 7.6 | 3.50 | 9.20 | 171.76 |
| 7 | MagTi-1 | E-14** | M-7 | 16.7 | 1000 | 7.8 | 8.9 | 0.33 | 4.1 | 6.16 | 9.25 | 170.68 |
|  | Mg(OEt)$_2$ | E-30** | ME-7 | 16.7 | 1000 | 4.7 | 5.3 | 0.22 | 2.5 | 5.58 | 6.71 | 170.56 |
|  | SHAC™ 310 | E-15 | S-7 | 16.7 | 4500 | 25.1 | 30.5 | 0.39 | 1.0 | 3.67 | 9.21 | 171.73 |
| 10 | MagTi-1 | E-20** | M-10 | 16.7 | 1500 | 6.3 | 7.6 | 0.34 | 3.7 | 6.15 | 9.27 | 169.90 |
|  | Mg(OEt)$_2$ | E-31** | ME-10 | 16.7 | 1500 | 8.4 | 10.3 | 0.23 | 4.3 | 7.54 | 6.61 | 169.69 |
|  | SHAC™ 310 | E-21 | S-10 | 8.4 | 13500 | 32.4 | 34.3 | 0.38 | 5.0 | 2.87 | 8.66 | 171.56 |

| Internal Electron Donor | Procatalyst Precursor | Run # | Procatalyst # | Procatalyst (mg) | H2 (scc) | Activity (kg/g-hr) | Activity (kg/g-hr) | BD (g/cc) | MFR (g/10 min) | XS (%) | PDI | TMF (° C.) |
|---|---|---|---|---|---|---|---|---|---|---|---|---|
|  | SHAC™ 310 | E-9 | S-4 | 16.7 | 13500 | 33.1 | 35.7 | 0.39 | 5.6 | 3.84 | 7.82 | 171.86 |
| 8 | MagTi-1 | E-16** | M-8 | 8.4 | 4500 | 22.6 | 24.7 | 0.34 | 1.7 | 5.64 | 8.32 | 170.82 |
|  | Mg(OEt)$_2$ | E-32* | ME-8 | 8.4 | 4500 | 14.9 | 17.3 | 0.24 | 5.9 | 5.69 | 6.62 | 170.22 |
|  | Mg(OCOEt)$_2$ | E-33** | MO-8 | 8.4 | 4500 | 10.1 | 10.2 | 0.23 | 103.6 | 10.33 |  |  |
|  | SHAC™ 310 | E-17 | S-8 | 8.4 | 13500 | 48.0 | 51.8 | 0.39 | 2.2 | 2.49 | 7.72 | 171.44 |
| 11 | MagTi-1 | E-22** | M-11 | 16.7 | 1500 | 7.7 | 8.6 | 0.29 | 2.9 | 7.45 | 8.46 | 170.11 |
|  | Mg(OEt)$_2$ | E-35** | ME-11 | 16.7 | 1500 | 9.0 | 10.1 | 0.22 | 3.7 | 6.20 | 6.75 | 169.28 |
|  | SHAC™ 310 | E-23 | S-11 | 16.7 | 13500 | 34.4 | 37.4 | 0.37 | 3.1 | 1.58 | 7.02 | 171.93 |
| 2 | MagTi-1 | E-4** | M-2 | 16.7 | 4500 | 28.3 | 32.0 | 0.33 | 3.5 | 3.37* | 5.69 | 171.62 |
|  | SHAC™ 310 | E-5 | S-2 | 8.4 | 3000 | 42.7 | 44.1 | 0.41 | 2.0 | 3.87* | 5.89 | 171.58 |
| 6 | MagTi-1 | E-12** | M-6 | 8.4 | 1500 | 39.9 | 41.6 | 0.36 | 1.0 | 2.57 | 5.73 | 170.32 |
|  | SHAC™ 310 | E-13 | S-6 | 8.4 | 3000 | 46.5 | 47.7 | 0.4 | 1.6 | 2.27 | 5.41 | 171.41 |

*XS by NMR method
**Comparative sample
BD = bulk density

A series of amide ester compounds are used as internal electron donors with various precursors: magnesium/titanium chloride/ethoxide complex (MagTi-1), magnesium ethoxide, carbonated magnesium ethoxide, SHAC™ 310, and magnesium chloride ethanol adduct. The applicants surprisingly discovered that high catalyst activity and high selectivity (i.e., high polymer isotacticity) are obtained when an alkoxy-free (or substantially alkoxy-free) SHAC™ 310 (a BenMag precursor) is utilized as a precursor. Precursors that contain a large amount of alkoxy species, such as $Mg(OEt)_2$, MagTi-1, and $Mg(OCOEt)_2$, show poor activity and poor selectivity.

TABLE 5

Catalyst Performance with Amide Ester Internal Electron Donor and Added Internal Donor and Polymer Properties

| 1st $TiCl_4$ Contacting | 2nd $TiCl_4$ Contacting | 3rd $TiCl_4$ Contacting | Procatalyst # | Run # | Activity (kg/g-hr) | BD (g/cc) | MFR (g/10 min) | XS (%) | PDI |
|---|---|---|---|---|---|---|---|---|---|
| IED1 | | | M-1-A | E-36** | 16.5 | 0.38 | 9.3 | 5.88 | 6.82 |
| IED1 + EB | | | M-1-EB-A | E-37 | 25.6 | 0.38 | 5.6 | 4.54 | 6.52 |
| IED1 + MPB | | | M-1-MPB-A | E-38 | 24.7 | 0.32 | 5.6 | 4.53 | 6.68 |
| IED1 + MPB*** | | | M-1-MPB-B | E-39 | 29.0 | 0.40 | 4.2 | 3.73 | 6.12 |
| MPB | IED1 | | M-1-MPB-C | E-40 | 23.8 | 0.35 | 3.1 | 4.33 | 7.10 |
| MPB | | IED1 | M-1-MPB-D | E-41 | 22.2 | 0.31 | 1.9 | 3.81 | 7.54 |

*XS by NMR method
**Comparative sample
***IED1 was added 2-3 minutes after the addition of MPB
BD = bulk density

TABLE 6

Catalyst Performance with Amide Ester Mixed Internal Electron Donor and Polymer Properties

| Procatalyst # | 1st $TiCl_4$ Contacting | | 2nd $TiCl_4$ Contacting | | 3rd $TiCl_4$ Contacting | | Activity (kg/g-h) | BD (g/cc) | MFR (g/10 min) | XS (%) | PDI |
|---|---|---|---|---|---|---|---|---|---|---|---|
| | EB | IED 8 | BC | IED 8 | BC | IED 8 | | | | | |
| M-8-EB-A | 0.60 | 1.20 | 0 | 0 | 0 | 0 | 33.5 | 0.36 | 2.5 | 4.81 | 8.00 |
| M-8-EB-B | 0.60 | 0 | 0 | 1.20 | 0 | 0 | 38.1 | 0.37 | 1.3 | 4.91 | 8.54 |
| M-8-EB-C | 0.60 | 0 | 0 | 0 | 0 | 1.20 | 31.7 | 0.38 | 2.2 | 4.97 | 8.81 |
| M-8-EB-D | 0.60 | 0.40 | 0 | 0.40 | 0 | 0.40 | 39.8 | 0.33 | 1.7 | 4.61 | 8.48 |
| M-8-EB-E | 0.60 | 1.20 | 0.30 | 0 | 0 | 0 | 51.9 | 0.35 | 2.5 | 3.93 | 7.32 |
| M-8-EB-F | 0.60 | 0 | 0.30 | 1.20 | 0 | 0 | 41.0 | 0.40 | 3.0 | 4.63 | 7.78 |
| M-8-EB-G | 0.60 | 0 | 0.30 | 0 | 0 | 1.20 | 35.1 | 0.41 | 2.6 | 4.99 | 8.38 |
| M-8-EB-H | 0.60 | 0.40 | 0.30 | 0.40 | 0 | 0.40 | 44.9 | 0.37 | 3.3 | 4.13 | 8.05 |
| M-8-MPB-A | 0.78 | 1.20 | 0 | 0 | 0 | 0 | 54.2 | 0.35 | 2.5 | 3.82 | 7.62 |
| M-8-MPB-B | 0.78 | 0 | 0 | 1.20 | 0 | 0 | 49.2 | 0.35 | 1.7 | 2.96 | 7.22 |
| M-8-MPB-C | 0.78 | 0 | 0 | 0 | 0 | 1.20 | 37.5 | 0.35 | 1.8 | 2.85 | 7.86 |
| M-8-MPB-D | 0.78 | 0.40 | 0 | 0.40 | 0 | 0.40 | 45.1 | 0.36 | 1.4 | 2.58 | 7.39 |

BC = Benzoyl Chloride

Applicants also discovered that a procatalyst composition having both high catalyst activity and high catalyst selectivity (high polymer isotacticity) is produced by introducing an electron donor component, such as ethyl benzoate (EB) or 1-methoxypropan-2-yl benzoate (MPB), into the reaction mixture.

Table 6 shows that high catalyst activity, low XS and high PDI are obtained with the present catalyst composition containing EB or MPB as the electron donor component. With the aid of the electron donor component, the main internal donor, IED 8, can be added in the first, second, and/or third $TiCl_4$ contacting step for fine tuning catalyst performance as well as fine tuning polymer properties. In addition, BC (benzoyl chloride), which is a chlorinating agent and can be converted into ethyl benzoate (EB) upon reaction with ethoxy group in the precursor. This further improves catalyst activity and polymer isotacticity when EB is employed as the electron donor component.

It is specifically intended that the present disclosure not be limited to the embodiments and illustrations contained herein, but include modified forms of those embodiments including portions of the embodiments and combinations of elements of different embodiments as come within the scope of the following claims.

The invention claimed is:

1. A process comprising:
   pre-halogenating a procatalyst precursor with a halogenating agent;
   adding an amide ester to the halogenated procatalyst precursor in a reaction mixture, the amide ester having the structure (II);

(II)

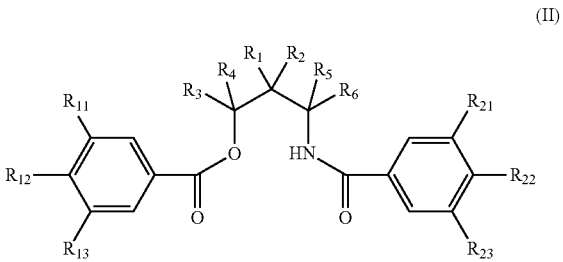

wherein $R_1$-$R_6$, $R_{11}$-$R_{13}$, and $R_{21}$-$R_{23}$ are the same or different, each of $R_1$-$R_6$, $R_{11}$, $R_{13}$ $R_{21}$, and $R_{23}$ is selected from a group consisting of hydrogen, a halogen, a substituted hydrocarbyl group having 1-20 carbon atoms, an unsubstituted hydrocarbyl group having 1-20 atoms, and combinations thereof and $R_{12}$ and $R_{22}$, each is a halogen; and forming a procatalyst composition comprising a magnesium moiety, a titanium moiety, and an internal electron donor comprising the amide ester.

2. The process of claim 1 comprising pre-halogenating a procatalyst precursor selected from a group consisting of a magnesium moiety compound, a magnesium mixed metal compound, a benzoate-containing magnesium chloride compound, and combinations thereof 3. The process of claim 1 comprising reacting the amide ester with the prehalogenated procatalyst precursor in the presence of titanium tetrachloride wherein the prehalogenated procatalyst precursor is a benzoate containing magnesium chloride compound.

4. The process of claim 1 comprising introducing, to the reaction mixture, an electron donor component; and forming a procatalyst composition comprising a mixed internal electron donor comprising the amide ester and the electron donor component.

5. The process of claim 1 comprising adding an amide ester to the halogenated procatalyst precursor in a reaction mixture, the amide ester having the structure (II) wherein $R_1$ and $R_2$ each is an unsubstituted hydrocarbyl group having 1-6 carbon atoms.

* * * * *